Patented Feb. 6, 1934

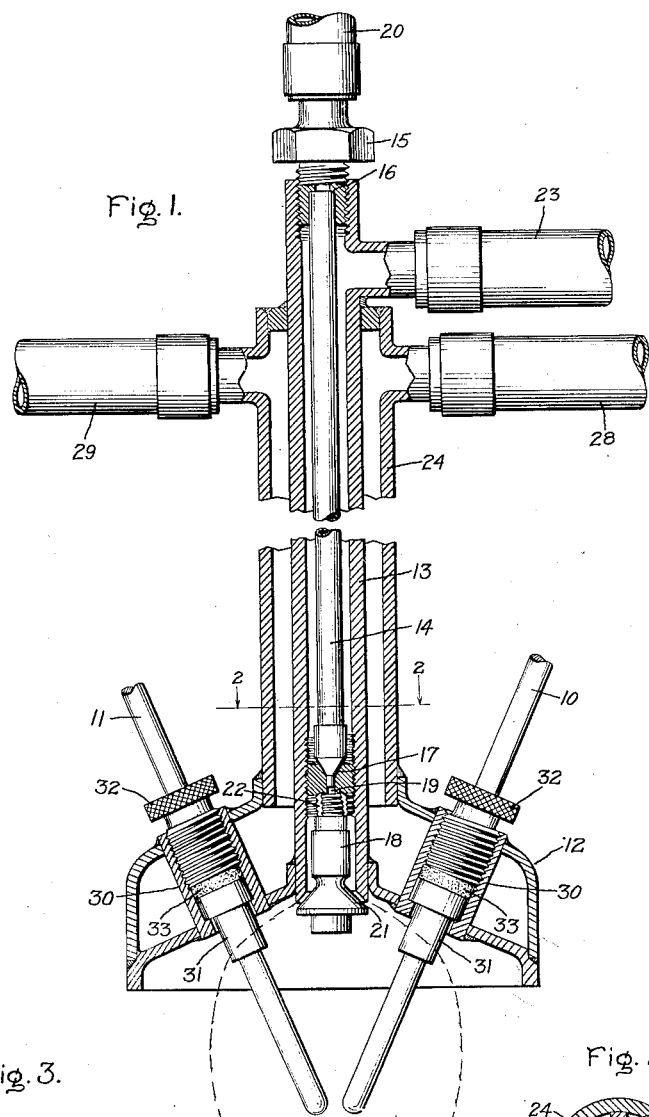

1,946,302

UNITED STATES PATENT OFFICE 1,946,302

WELDING APPARATUS

Irving F. Weller, Schenectady, N. Y., assignor to General Electric Company, a corporation of New York Application May 1, 1931. Serial No. 534,302

7 Claims. (Cl. 219—8)

My invention relates to welding, and more particularly to gas-arc welding.

In gas-arc welding, the welding operation is conducted through the agency of an electric arc and a gas or mixture of gases. One form of gas-arc welding for which my invention is particularly suited is atomic hydrogen welding. In this form of welding hydrogen is dissociated by an arc and carried in its dissociated state to the work where upon recombination it liberates an enormous amount of heat which is utilized in performing the welding operation. One way of accomplishing this result is to direct a jet of hydrogen across an arc into contact with the work. Part of the gas of the jet is dissociated in the arc and carried to the work where it recombines.

It has been found desirable to protect arcing terminals of the welding torch and the work being welded during the welding operation by a surrounding envelope of hydrogen which in the presence of air ignites and burns forming a flame about the electrodes and the work being welded.

It is an object of my invention to provide a gas-arc torch of improved construction which is provided with a nozzle for producing a bulbous flame which completely encloses and protects the arcing terminals of the welding electrodes as well as the work being welded.

My invention will be better understood from the following description taken in connection with the accompanying drawing, and its scope will be pointed out in the appended claims.

In the drawing Fig. 1 is a side view partly in section of a welding torch embodying my invention; Fig. 2 is a section of Fig. 1 taken along the lines 2—2, and Fig. 3 is a modified form of the torch shown in Fig. 1.

The torch shown in Fig. 1 comprises a plurality of electrodes 10 and 11 supported in a hood 12 through the central portion of which extends a compound nozzle by means of which a blast of gas is directed across the arcing terminals of the electrodes and a bulbous shielding flame produced about them and the work being welded. This nozzle comprises a pipe 13 in which is located a second pipe 14. Pipe 14 is supported in pipe 13 by a cap 15 which closes one end of pipe 13 and furnishes a seat 16 for one end of pipe 14, and by a deflector plug 18 which is located in the discharge end of a pipe 13 and furnishes a seat 17 for the other end of pipe 14. The plug 18 has an opening 19 registering with the opening in pipe 14 through which a jet of gas is supplied across the arcing terminals of electrodes 10 and 11. Gas is supplied to pipe 14 from a suitable source of supply through a pipe 20 and cap 15. The deflector plug 18 has a conical surface 21 which coacts with the inwardly beveled end of pipe 13 to form an outwardly flared annular outlet through which gas is discharged from pipe 13 by way of passages 22. Plug 18 and cap 15 are adjustable along the length of pipe 13 and, by adjusting these members, the size of the discharge outlet formed between the deflecting surface 21 of plug 18 and the beveled discharge end of pipe 13 may be varied to control the size of the flame produced by gas discharged through this outlet. In the arrangement illustrated in the drawing the adjustment of plug 18 and cap 15 in pipe 13 is obtained by threading these members into the ends of the pipe. It is of course apparent that other arrangements may be employed by which this adjustment may be accomplished. Gas is supplied to the tube 13 through a pipe 23.

The hood 12 is a double walled hood through which a cooling fluid such as water is circulated. The cooling fluid is supplied to the hood through a pipe 24 located about pipe 13. The space between pipes 13 and 24 is divided longitudinally into two channels 25 and 26 by fins 27 attached to pipe 13 and extending to the inside walls of pipe 24. The cooling fluid is supplied to pipe 24 through a pipe 28 connected to passageway 25 and is conducted through this passageway to hood 12 through which it circulates and from which it is discharged through passageway 26 and pipe 29 connected thereto.

The electrodes 10 and 11 extend through thimbles 30 connecting the inner and outer walls of the double walled hood 12. The electrodes are electrically insulated from the hood and the thimble by means of bushings 31 and 32 formed of an insulating material. Bushing 32 is threaded to engage a thread in the thimble 30 and a packing 33 of some material such as asbestos is held in place between the bushings and about the electrodes by screwing bushing 32 into thimble 30. This packing is provided to prevent air flowing along the electrodes through the bushings supporting these electrodes. It also serves to clamp the electrodes in adjusted positions in hood 12.

In the drawing the shape of the flame produced by the nozzle has been illustrated by dotted lines. It will be noted that the flame is of a bulbous shape although the gas leaves the annular outlet between the conical surface 21 of the deflector plug 18 and the discharge end of the tube 13 as if it would generate a conical flame. The length of the flame will depend upon the velocity of the gas supplied through the nozzle and particularly through the opening 19 in plug 18. By increasing the velocity of the jet of gas supplied through opening 19 the flame will be lengthened and by decreasing its velocity the flame will be shortened. It is also to be noted that the bushings 31 protect the electrodes at the points where the flame cuts across them. If some protection were not thus furnished, the electrodes would be consumed or eroded at these places. One of the important features of applicant's nozzle is that it produces a flame which completely envelops those portions of the electrodes extending beyond the holders and protects them as well as the work immediately below the arcing terminals of the electrodes from the influence of the air in which the welding operation is normally conducted.

In Fig. 3 a modified form of the torch shown in Fig. 1 has been illustrated. In this figure the hood illustrated at 34 has inturned edges which together with the bulbous flame produced by the discharge of gas through outlet 35 protect the portions of the electrodes 36 and 37 extending through the bushings 38 and 39 which do not as in Fig. 1 extend along the electrodes a sufficient distance to protect the electrodes in the absence of the particular hood illustrated. The construction shown in Fig. 3 also differs from that shown in Fig. 1 in that the electrode bushings are differently constructed. In Fig. 3 the bushings in each thimble are of like configuration and are held in place in the hood by thimbles having nuts 40 threaded on the portion of the thimbles 41 extending above the hood 34. Except for the features above noted, the torch shown in Fig. 3 is like that shown in Fig. 1, like parts being identified by the same reference numerals of Figs. 1 and 2 primed.

I have illustrated and described my invention as applied to a torch having the general construction of the torch shown and described in the case of James T. Catlett, Serial No. 534,362 for Welding apparatus, filed concurrently herewith, and assigned to the same assignee as the present case. The novel features of the torch, except as covered in the present case, have been claimed in that case.

While I have shown and described particular embodiments of my invention, numerous modifications thereof will readily present themselves to those skilled in the art, and I therefore aim to cover by the following claims all such modifications as fall within the true spirit and scope of my invention.

What I claim as new and desire to secure by Letters Patent of the United States, is:

1. Welding apparatus comprising means for holding an electrode, and means for producing a bulbous flame about the arcing terminal of said electrode.

2. Welding apparatus comprising means for holding a plurality of electrodes in convergent positions relative to one another, and means for producing a bulbous flame about the arcing terminals of said electrode.

3. Welding apparatus comprising means for holding a plurality of electrodes in convergent positions relative to one another, means for producing a bulbous flame about the arcing terminals of said electrodes, and means for directing a concentrated blast of hydrogen across the arcing terminals of said electrode.

4. Welding apparatus comprising means for holding an electrode, means for producing a bulbous flame about the arcing terminal of said electrode, and means for protecting said electrode against the action of said flame where it cuts across said electrode.

5. Gas arc welding apparatus comprising a nozzle having an outwardly flared annular outlet, and means for supporting a plurality of electrodes with their arcing terminals surrounded by the gas supplied through said outlet.

6. Gas arc welding apparatus comprising a nozzle having an outwardly flared annular outlet, means for supporting a plurality of electrodes with their arcing terminals surrounded by gas supplied through said outlet, and means for directing a jet of gas across the arcing terminals of said electrodes.

7. Gas arc welding apparatus comprising a pipe having a flared outlet, a conical deflector in said flared outlet, means for adjusting the spacing of said deflector relative to said flared outlet, and means for supporting a plurality of electrodes with their arcing terminals surrounded by the gas supplied through said pipe and the opening between said flared outlet and said conical deflector.

IRVING F. WELLER.